(12) United States Patent
Prakken et al.

(10) Patent No.: US 11,713,146 B2
(45) Date of Patent: Aug. 1, 2023

(54) PACKING METHOD OF PACKING ARTICLES INTO A PACKING BOX, AND CORRESPONDING PACKING DEVICE

(71) Applicant: BluePrint Holding B.V., Woerden (NL)

(72) Inventors: Nicolaas Martin Prakken, Woerden (NL); Gerald Eugene Renoux, Lyons, CO (US)

(73) Assignee: BluePrint Holding B.V., Woerden (NL)

( * ) Notice: Subject to any disclaimer, the term of this patent is extended or adjusted under 35 U.S.C. 154(b) by 0 days.

(21) Appl. No.: 17/258,463

(22) PCT Filed: Jul. 5, 2019

(86) PCT No.: PCT/NL2019/050424
§ 371 (c)(1),
(2) Date: Jan. 7, 2021

(87) PCT Pub. No.: WO2020/013687
PCT Pub. Date: Jan. 16, 2020

(65) Prior Publication Data
US 2021/0284370 A1    Sep. 16, 2021

Related U.S. Application Data

(60) Provisional application No. 62/695,423, filed on Jul. 9, 2018.

(30) Foreign Application Priority Data

Jul. 19, 2018    (NL) ..................................... 2021352

(51) Int. Cl.
*B65B 5/06*    (2006.01)
*B65B 35/36*    (2006.01)
(Continued)

(52) U.S. Cl.
CPC ............... *B65B 35/36* (2013.01); *B65B 5/06* (2013.01); *B65B 35/44* (2013.01); *B65B 35/52* (2013.01);
(Continued)

(58) Field of Classification Search
CPC ......... B65B 5/0614; B65B 5/06; B65B 5/101; B65B 35/36; B65B 35/50; B65B 35/24;
(Continued)

(56) References Cited

U.S. PATENT DOCUMENTS 3,766,706 A * 10/1973 Graham ................ B65B 63/022
                                                            53/529
4,608,808 A *  9/1986 Ryan .......................... B65B 5/10
                                                            53/436
(Continued)

FOREIGN PATENT DOCUMENTS

DE    102016201282      8/2017
DE    102016201282 A1 * 8/2017 ............. B65B 23/00
(Continued)

*Primary Examiner* — Andrew M Tecco
(74) *Attorney, Agent, or Firm* — N.V. Nederlandsch Octrooibureau (57) ABSTRACT

A packing method of packing articles into a packing box comprises pre-grouping articles on a pre grouping surface provided by a pre grouping conveyor belt of a pre grouping conveyor, and providing the articles from the pre-grouping surface of the pre-grouping conveyor belt into the packing box. This is done consecutively by providing one of a cassette box and the packing box at a discharging end of the pre-grouping conveyer; moving downwards said one of the cassette box and the packing box while driving the pre grouping conveyor belt such that the pre-grouped articles on the pre-grouping conveyer-belt moves towards the discharging end of the pre-grouping conveyor and the opening of said one of the cassette box and the packing box, and that the articles of the pre-grouped articles are discharged from the (Continued)

pre-grouping conveyor belt into said one of the cassette box and the packing box and onto one another; and, in case the articles of the pre-grouped articles are provided into the cassette box, providing the articles from the cassette box into the packing box.

15 Claims, 7 Drawing Sheets

(51) Int. Cl.
*B65B 35/44* (2006.01)
*B65B 35/52* (2006.01)
*B65B 39/00* (2006.01)
*B65G 23/32* (2006.01)
*B65G 37/00* (2006.01)
*B65G 47/26* (2006.01)
*B65G 47/90* (2006.01)

(52) U.S. Cl.
CPC .......... *B65B 39/007* (2013.01); *B65G 23/32* (2013.01); *B65G 37/005* (2013.01); *B65G 47/268* (2013.01); *B65G 47/902* (2013.01); *B65G 2203/0225* (2013.01)

(58) Field of Classification Search
CPC .... B65B 35/52; B65G 47/268; B65G 47/082; B65G 2203/0225
See application file for complete search history.

(56) References Cited

U.S. PATENT DOCUMENTS

| | | | |
|---|---|---|---|
| 5,430,994 A * | 7/1995 | Focke | B65G 47/647 |
| | | | 53/493 |
| 6,711,880 B2 * | 3/2004 | Wipf | B65B 35/58 |
| | | | 53/450 |
| 6,959,525 B2 | 11/2005 | Prakken | |
| 7,856,797 B2 * | 12/2010 | Black | B65B 35/44 |
| | | | 53/247 |
| 7,904,198 B2 * | 3/2011 | Hawes | B25J 11/0045 |
| | | | 414/735 |
| 10,549,923 B2 * | 2/2020 | Crissinger | B65G 47/084 |
| 2006/0182603 A1 * | 8/2006 | Hawes | A22C 17/0093 |
| | | | 414/735 |
| 2009/0249750 A1 * | 10/2009 | Black | B65B 35/52 |
| | | | 901/14 |
| 2012/0006651 A1 * | 1/2012 | Cote | B25J 15/00 |
| | | | 198/468.6 |
| 2017/0203861 A1 * | 7/2017 | Van Halsema | B65B 43/52 |
| 2018/0244410 A1 * | 8/2018 | Peterman | B65B 35/36 |

FOREIGN PATENT DOCUMENTS

| | | | | |
|---|---|---|---|---|
| EP | 3196132 | | 7/2017 | |
| GB | 2046711 | | 11/1980 | |
| GB | 2046711 A | * | 11/1980 | ............ B65B 35/24 |
| GB | 2540429 | | 1/2017 | |
| GB | 2540429 A | * | 1/2017 | ............ B65B 35/50 |
| WO | 2014075151 | | 5/2014 | |
| WO | 2017041007 | | 3/2017 | |
| WO | WO-2017041007 A1 | * | 3/2017 | ............ B65B 35/36 |

\* cited by examiner

PACKING METHOD OF PACKING ARTICLES INTO A PACKING BOX, AND CORRESPONDING PACKING DEVICE

FIELD OF THE INVENTION

The invention relates to a packing method of packing articles into a packing box. The invention further relates to a corresponding packing device.

BACKGROUND OF THE INVENTION

Packing of articles into packing boxes is well known and widely employed. The articles are generally products in a product holder, bag or wrapping, such as bags of crisps, bags or boxes of candy, bags of a sauce or the like for cooking, etcetera. The methods usually concern a continuous supply of products that are provided into the packing box on a more or less individual basis into the packing box. However, this imposes limitations on the cycle time of filling individual boxes with such articles.

SUMMARY OF THE INVENTION

It is an objective of the invention to provide a method of packing articles into a packing box that provides for a reduced cycle time of filling a packing box.

It is another or alternative objective of the invention to provide a packing method of packing articles into a packing box that allows a more efficient use of article supply lines for packing articles.

At least one of the above objectives is achieved by a packing method of packing articles into a packing box, the method comprising pre-grouping articles to be packed into the packing box into a set of pre-grouped articles on a pre-grouping surface provided by a pre-grouping conveyor-belt of a pre-grouping conveyor; and providing the articles of the set of pre-grouped articles from the pre-grouping surface of the pre-grouping conveyor-belt into the packing box consecutively by:

providing one of a cassette box and the packing box at a discharging end of the pre-grouping conveyer such that an opening of said one of the cassette box and the packing box faces the discharging end of the pre-grouping conveyor;

moving downwards said one of the cassette box and the packing box while driving the pre-grouping conveyor-belt such that the set of pre-grouped articles on the pre-grouping surface of the pre-grouping conveyer-belt moves towards the discharging end of the pre-grouping conveyor and the opening of said one of the cassette box and the packing box, and that the articles of the set of pre-grouped articles are discharged from the pre-grouping conveyor-belt into said one of the cassette box and the packing box and onto one another; and in case the articles of the set of pre-grouped articles are provided into the cassette box, providing the articles from the cassette box into the packing box.

In an embodiment, the pre-grouping conveyor comprises first and second pre-grouping conveyor parts, each having a pre-grouping conveyor-belt comprising the pre-grouping surface, and initially articles are pre-grouped into a set of pre-grouped articles on the pre-grouping conveyor-belt of the second pre-grouping conveyor part and are subsequently transferred to the pre-grouping conveyor-belt of the first pre-grouping conveyor part by driving the conveyor-belts of the first and second pre-grouping conveyor parts.

In an embodiment the pre-grouping conveyor comprises at least two stretches of pre-grouping conveyor-belt, each stretch of pre-grouping conveyor-belt comprising the pre-grouping surface and being guided along a same track of the pre-grouping conveyor and each stretch of pre-grouping conveyor-belt being driven by a separate drive to allow driving the stretches of pre-grouping conveyor-belt independent from one another, and initially articles are pre-grouped into a set of pre-grouped articles on a stretch of pre-grouping conveyor-belt and subsequently are provided from the respective stretch of pre-grouping conveyor-belt into said one of the cassette box and the packing box by appropriately driving the respective stretch of pre-grouping conveyor-belt.

In an embodiment, said one of the cassette box and the packing box is moved downwards in a continuous fashion and the respective pre-grouping conveyor-belt is moved in a continuous fashion for discharging the articles from the respective pre-grouping conveyor-belt into said one of the cassette box and the packing box into said one of the cassette box and the packing box.

In an embodiment, the pre-grouping conveyor-belt is driven at a velocity providing sufficient speed to each article of the set of pre-grouped articles discharged from the pre-grouping conveyor-belt to bridge a gap between the discharge end of the pre-grouping conveyor and said one of the cassette box and the packing box.

In an embodiment, said one of the cassette box and the packing box is held and moved by a robot arm of a packing robot, the robot arm allowing for a movement thereof to position said one of the cassette box and the packing box, optionally the robot arm allowing for an articulated movement, optionally the robot arm being configured as a beam that can be driven in at least two orthogonal directions and having a pivotal arrangement at an end of the beam for holding said one of the cassette box and the packing box.

In an embodiment, the articles are pre-grouped in at least one row of articles to provide a set of pre-grouped articles such that each subsequent article in a row partly overlaps a preceding article in the row.

In an embodiment, a first article in each row of the at least one row is at an end of the row associated with a discharging end of the pre-grouping conveyor.

In an embodiment, the articles are supplied on at least one article supply conveyor to the pre-grouping surface.

In an embodiment, the articles are positioned on the pre-grouping surface using a delta robot to provide the set of pre-grouped articles.

In an embodiment, the article supply conveyor is provided in line with but at a higher level than the pre-grouping conveyor, and the pre-grouping conveyor is driven intermittently to provide a set of pre-grouped articles such that each subsequent article in a row partly overlaps a preceding article in the row.

In another aspect, the invention provides for a packing device for packing articles into a packing box, the device comprising a pre-grouping conveyor having a pre-grouping conveyor-belt providing a pre-grouping surface for pre-grouping articles to be packed into the packing box into a set of pre-grouped articles;

an arrangement for pre-grouping articles to be packed into the packing box into the set of pre-grouped articles on the pre-grouping surface; and a holding and manipulating assembly providing one of a cassette box and the packing box at a discharging end of the pre-grouping conveyor such that an opening of said one of the cassette and the packing box faces the discharging end of the pre-grouping conveyor, wherein the packing device is configured for performing a packing method according to the invention.

In an embodiment the arrangement for pre-grouping articles comprises a pre-grouping conveyor comprising first and second pre-grouping conveyor parts, each having a pre-grouping conveyor-belt comprising the pre-grouping surface.

In an embodiment the arrangement for pre-grouping articles comprises a pre-grouping conveyor comprising at least two stretches of pre-grouping conveyor-belt, each stretch of pre-grouping conveyor-belt comprising the pre-grouping surface and being guided along a same track of the pre-grouping conveyor and each stretch of pre-grouping conveyor-belt being driven by a separate drive to allow driving the stretches of pre-grouping conveyor-belt independent from one another.

In an embodiment, the holding and manipulating assembly comprises a packing robot having a robot arm for holding and moving said one of the cassette box and the packing box, the robot arm allowing for a movement thereof to position said one of the cassette box and the packing box, optionally the robot arm allowing for an articulated movement, optionally the robot arm being configured as a beam that can be driven in at least two orthogonal directions and having a pivotal arrangement at an end of the beam for holding said one of the cassette box and the packing box.

BRIEF DESCRIPTION OF THE DRAWINGS

Further features and advantages of the invention will become apparent from the description of the invention by way of non-limiting and non-exclusive embodiments. These embodiments are not to be construed as limiting the scope of protection. The person skilled in the art will realize that other alternatives and equivalent embodiments of the invention can be conceived and reduced to practice without departing from the scope of the present invention. Embodiments of the invention will be described with reference to the accompanying drawings, in which like or same reference symbols denote like, same or corresponding parts, and in which.

DETAILED DESCRIPTION OF EMBODIMENTS

Figure 1:
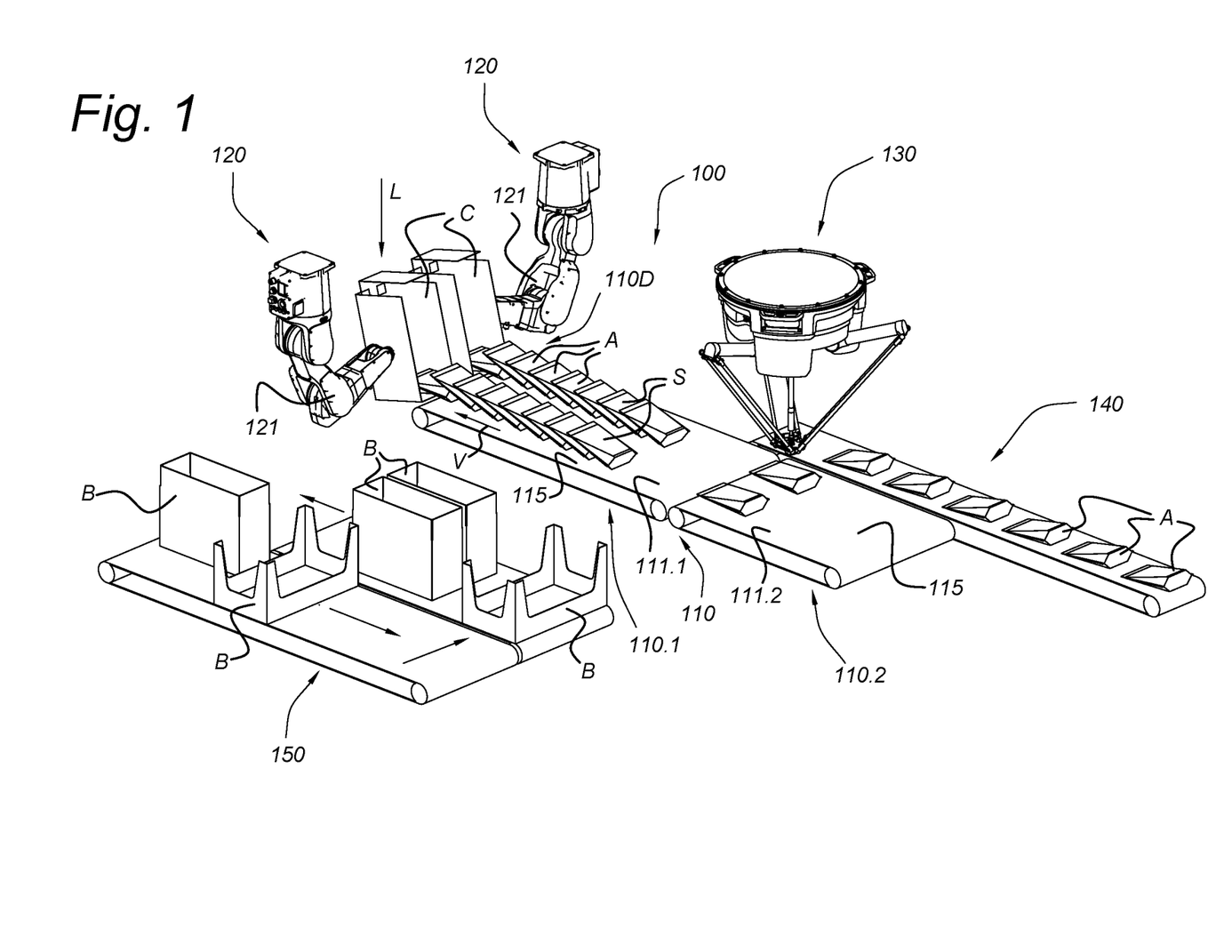
FIG. 1 shows a packing device employing a packing method according to an embodiment of the invention.
Figure 2:
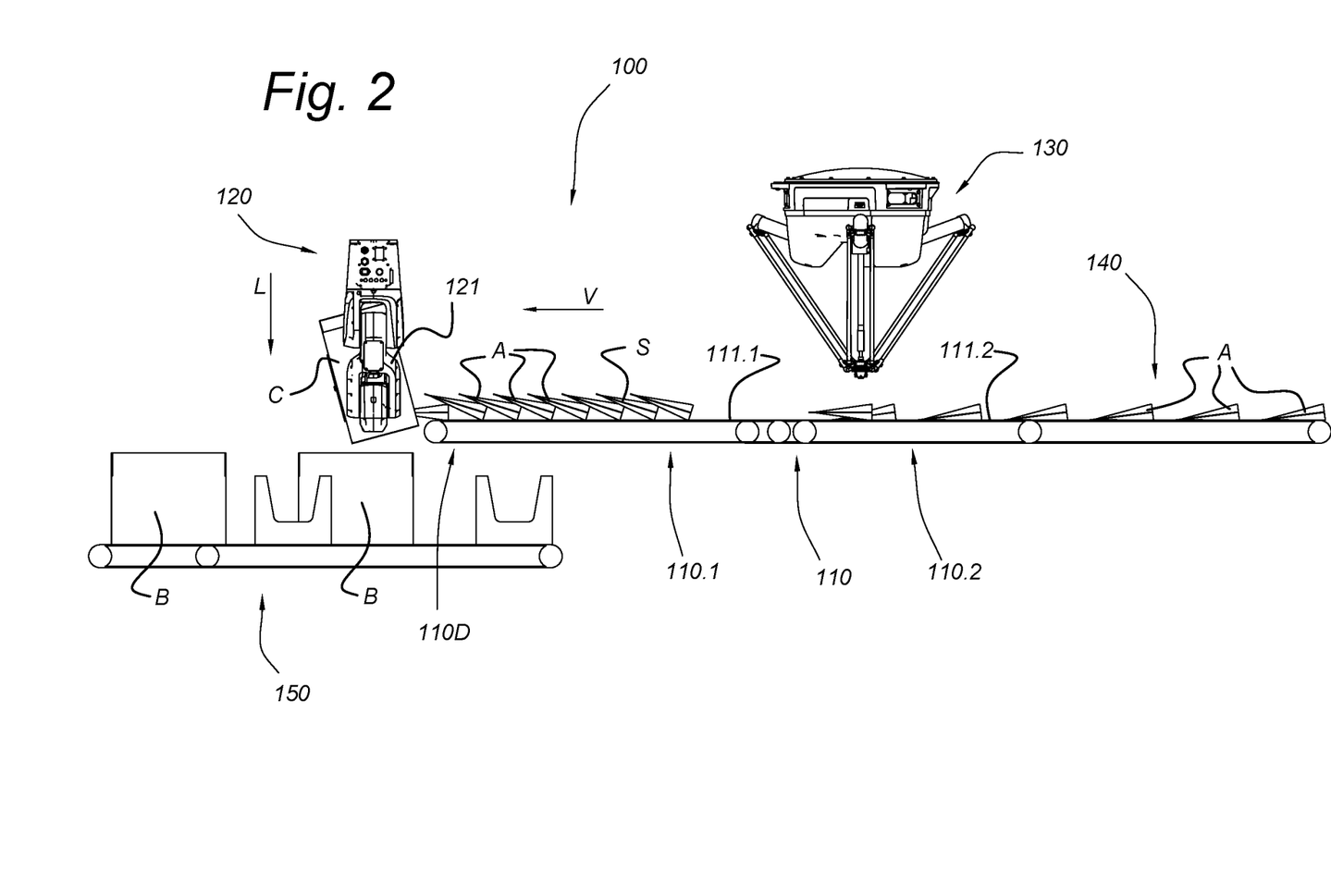
FIG. 2 shows a side view of the device of FIG. 1.
Figure 3:
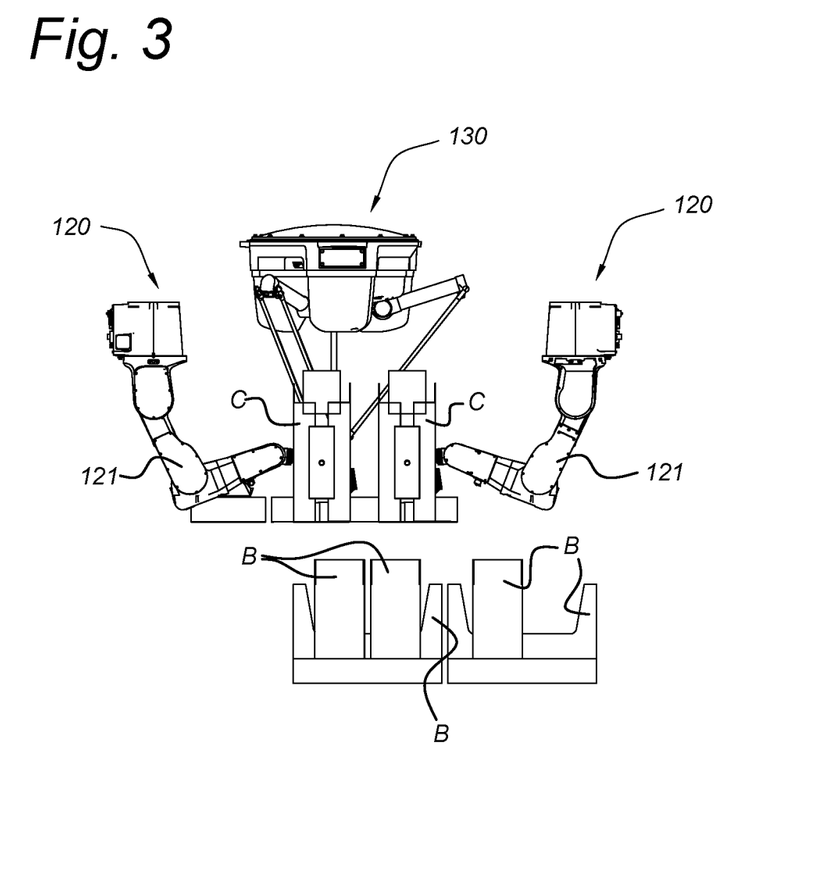
FIG. 3 shows another side view of the device of FIG. 1.

FIGS. 1, 2 and 3 show a packing device 100, which employs a corresponding packing method, for packing articles A into packing boxes B. The articles A are supplied on an article supply conveyor 140 to a pre-grouping conveyor 110 having first and second pre-grouping conveyor parts 110.1, 110.2 for pre-grouping of articles A into two sets S of pre-grouped articles. In an initial step, individual articles A are taken from the article supply conveyor 140 by a delta robot 130 and positioned onto the pre-grouping conveyor-belt 111.2 of the second pre-grouping conveyor part 110.2. Two articles A are shown positioned next to one another on the second pre-grouping conveyor part 110.2 of FIG. 1. More articles will be placed onto the second pre-grouping conveyor part 110.2 by the delta robot 130, which is not shown in the figures. In a subsequent step, the sets S of pre-grouped articles are provided from the second pre-grouping conveyor part 110.2 onto the first pre-grouping conveyor part 110.1 by driving the respective pre-grouping conveyor-belts 111.1, 111.2 of the first and second pre-grouping conveyor parts 110.1, 110.2. FIGS. 1 and 2 show two sets S of articles A on the pre-grouping conveyor-belt 111.1 of the first pre-grouping conveyor part 110.1. Each set S comprises a row of articles A, and is initially assembled on the pre-grouping conveyor-belt 111.2 of the second pre-grouping conveyor part 110.2, after which it is transferred to the first pre-grouping conveyor part 110.1 of the pre-grouping conveyor 110.

The articles are thus pre-grouped into two sets S of articles A on a pre-grouping surface 115 provided by the pre-grouping conveyor-belts 111.1, 111.2 of the first and second pre-grouping conveyor parts 110.1, 110.2 of the pre-grouping conveyor 110. In alternative embodiments, the articles may be pre-grouped in one set or in more than two sets next to one another. Each set S of articles comprises a row of articles A. In alternative embodiments, each set may comprise more than one row of articles. When the articles A have been pre-grouped in two sets S of pre-grouped articles on the pre-grouping surface 115 of the pre-grouping conveyer-belt 111.1 of the first pre-grouping conveyor part 110.1, the articles are subsequently provided into two packing boxes B, as shown in FIG. 1. The articles A are pre-grouped in one or more rows of articles such that each subsequent article in a row partly overlaps a preceding article in the row. The first article in the row is associated with the discharging end 110D of the pre-grouping conveyor 110.

Each set S of pre-grouped articles A is associated with one packing box. For that purpose, two cassette boxes C are arranged at the discharging end 110D of the pre-grouping conveyor 110, each cassette box C being associated with a single packing box B. Openings C1 of the cassette boxes face the discharging end 110D of the pre-grouping conveyor 110, especially of the first pre-grouping conveyor part 110.1. Each cassette C is held by a robot arm 121 of a packing robot 120. The robot arms are movable to allow positioning the cassette box C. In the embodiment shown, each cassette box C has its own associated packing robot 120 with associated robot arm 121, which are articulated robot arms. In an alternative embodiment, both cassettes can be held by a single robot arm.

Figure 4:
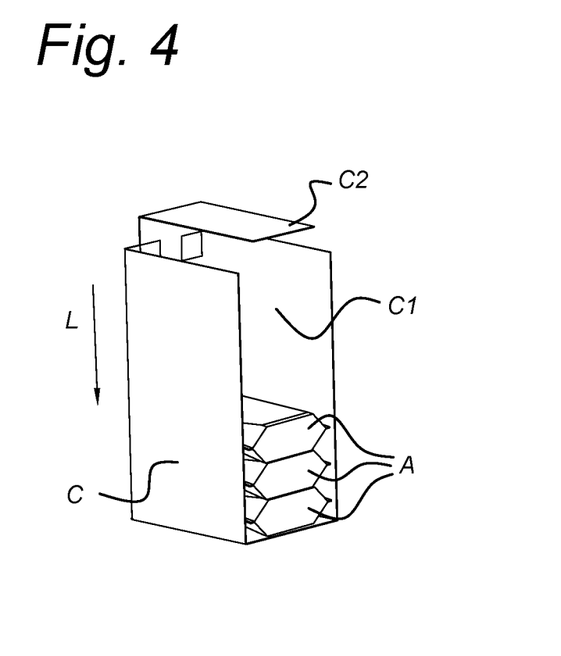
FIG. 4 shows a detailed view of a cassette of the embodiment of FIG. 1.

The cassette boxes C are filled with articles A of the sets S of pre-grouped articles by driving the conveyor-belt 111.1 such that the sets S of pre-grouped articles A on the pre-grouping surface 115 of the pre-grouping conveyer-belt 111.1 move towards the discharging end 110D of the pre-grouping conveyor 110, and that the articles of the set of pre-grouped articles are discharged from the pre-grouping conveyor-belt into the cassette box and onto one another. To achieve so, the cassette box C is moved downwards, as indicated by the arrow L in the figures, at the same time as driving the pre-grouping conveyor-belt, both in a continuous fashion. FIG. 4 shows the cassette box C filled with some articles A in more detail. The first article in the row of a set of pre-grouped articles will be supported on a side wall of the cassette box, while each subsequent article provided in the cassette box is supported on the preceding article of the pre-grouped set. The pre-grouping conveyor-belt 111.1 is driven at a velocity V providing sufficient speed to each article A of the set S of pre-grouped articles discharged from the pre-grouping conveyor-belt 111.1 to bridge a gap between the discharge end 110D of the pre-grouping conveyor 110 and the cassette box C.

At the moment that a cassette boxes C is filled with articles A, the movable side wall C2 of the cassette box is moved towards and against the stack of articles inside the cassette box for holding them. Subsequently, the associated robot arm 121 is moved such that each cassette box is positioned above an associated packing box B on the packing box supply conveyor 150 with its open end C1 facing downwards. The movable wall C2 is then released so that the articles A drop from the cassette box inside a packing box for filling of the packing box with the articles. The cassette boxes C may be provided with additional door-like mechanisms to allow for fully or partly closing the open side C1 for enhanced holding of articles inside the cassette boxes while positioning towards the packing boxes.

In the embodiment of FIGS. 1 to 3, two cassette boxes C and two packing boxes B can be filled at the same time. However, other types of packing boxes can be used, which are shown for illustrative purposes in FIGS. 1 to 3 as well. The figures also show a single packing box that is to be filled by using both cassette boxes at the same time, and a single packing box that is to be filled by a single cassette box while not using the second cassette box. The packing device and corresponding packing method may also be provided in other configurations.

In an alternative embodiment, a packing box B is held by a robot arm 121 of a packing robot 120, and manipulated as described above with respect to the cassette box C. The packing box in this alternative embodiment is filled directly with articles A from the pre-grouping conveyor 110. A packing box B is taken from the packing box supply conveyor 150 by the packing robot for subsequent filling with articles. After the packing box has been filled with articles, it is repositioned on the packing box supply conveyor.

According to an alternative embodiment, the packing device and corresponding method provide a single pre-grouping conveyor with pre-grouping conveyor-belt on which articles are pre-grouped and from which articles are provided into the cassette box or the packing box directly.

Figure 5:
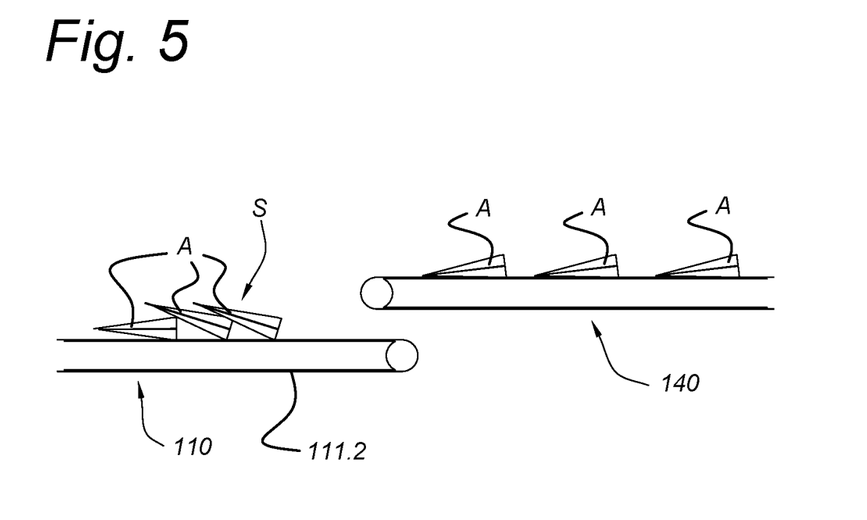
FIG. 5 shows an alternative embodiment for pre-grouping articles on a pre-grouping surface.

An alternative to a delta robot for placing and pre-grouping of articles on the pre-grouping surface 115 is shown in FIG. 5. The article supply conveyor 140 is arranged in line with but at a higher level than the pre-grouping conveyor 110. The pre-grouping conveyor-belt 111.2 of the pre-grouping conveyor 110 is advanced intermittently to provide a set S of pre-grouped and partly overlapping articles A from the flow of articles supplied by the article supply conveyor 140.

Figure 6:
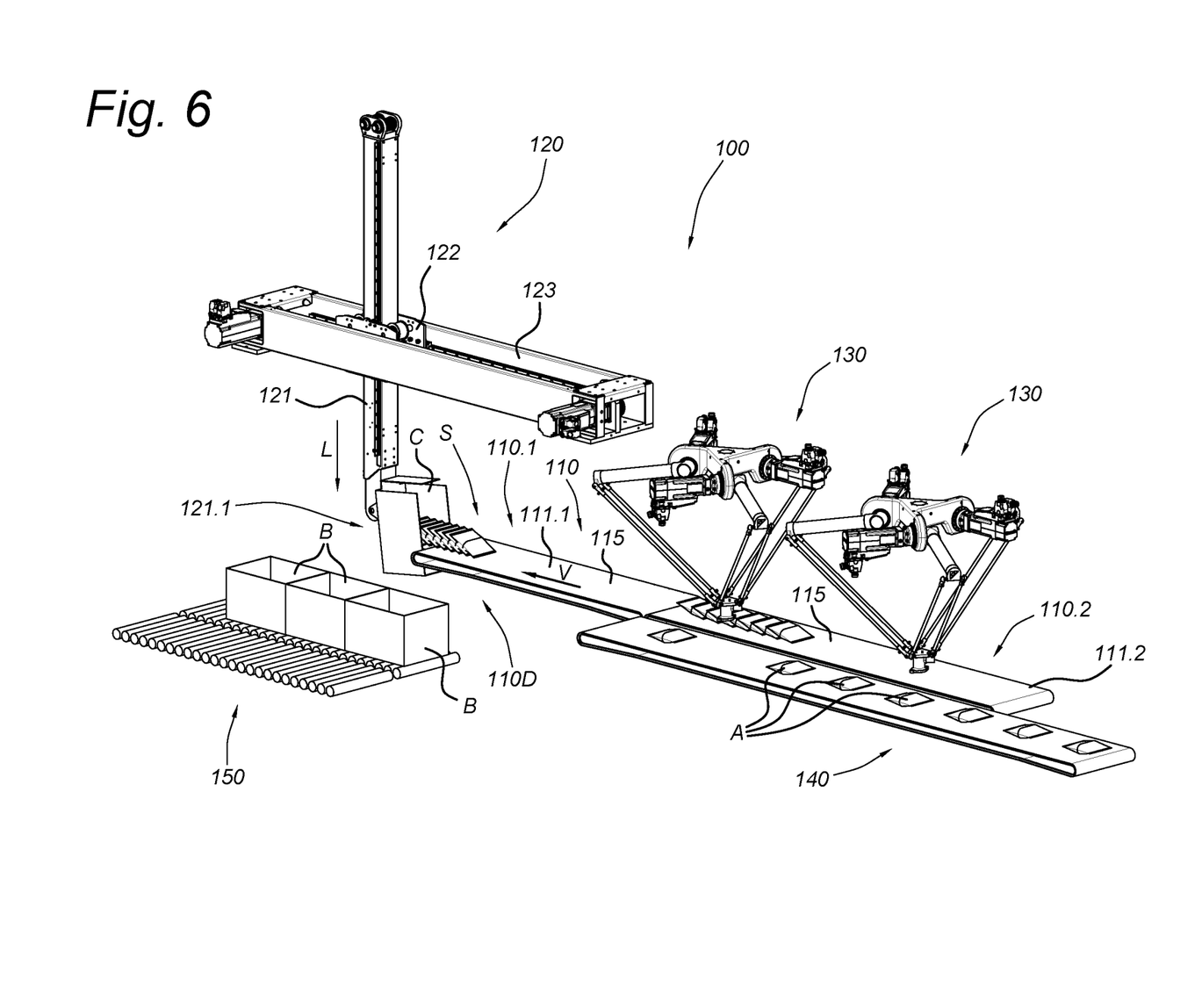
FIG. 6 shows another embodiment of the invention.

FIG. 6 shows yet another embodiment of the invention. The embodiment of FIG. 6 resembles the embodiment of FIGS. 1 to 3, but shows a different type of packing robot 120 that employs two linear drives 122, 123 for positioning the bottom end 121.1 of the robot arm 121, which is configured as a beam, in a vertical plane. The robot arm beam can be driven along its length in the vertical direction and in a direction along the longitudinal direction of the pre-grouping conveyor. The linear drive 122 provides for a continuous downward movement, as indicated by arrow L, when driving the pre grouping conveyor belt 111.1 to provide a set S of articles A into the cassette box C mounted at the end 121.1 of the robot arm 121. The end 121.1 of robot arm 121 is provided with a pivotal arrangement that allows for a pivotal movement of the cassette box C to subsequently provide the articles into a packing box B supplied by the packing box supply conveyor 150 as has been described with reference to the embodiment of FIGS. 1-3.

Figure 7A:
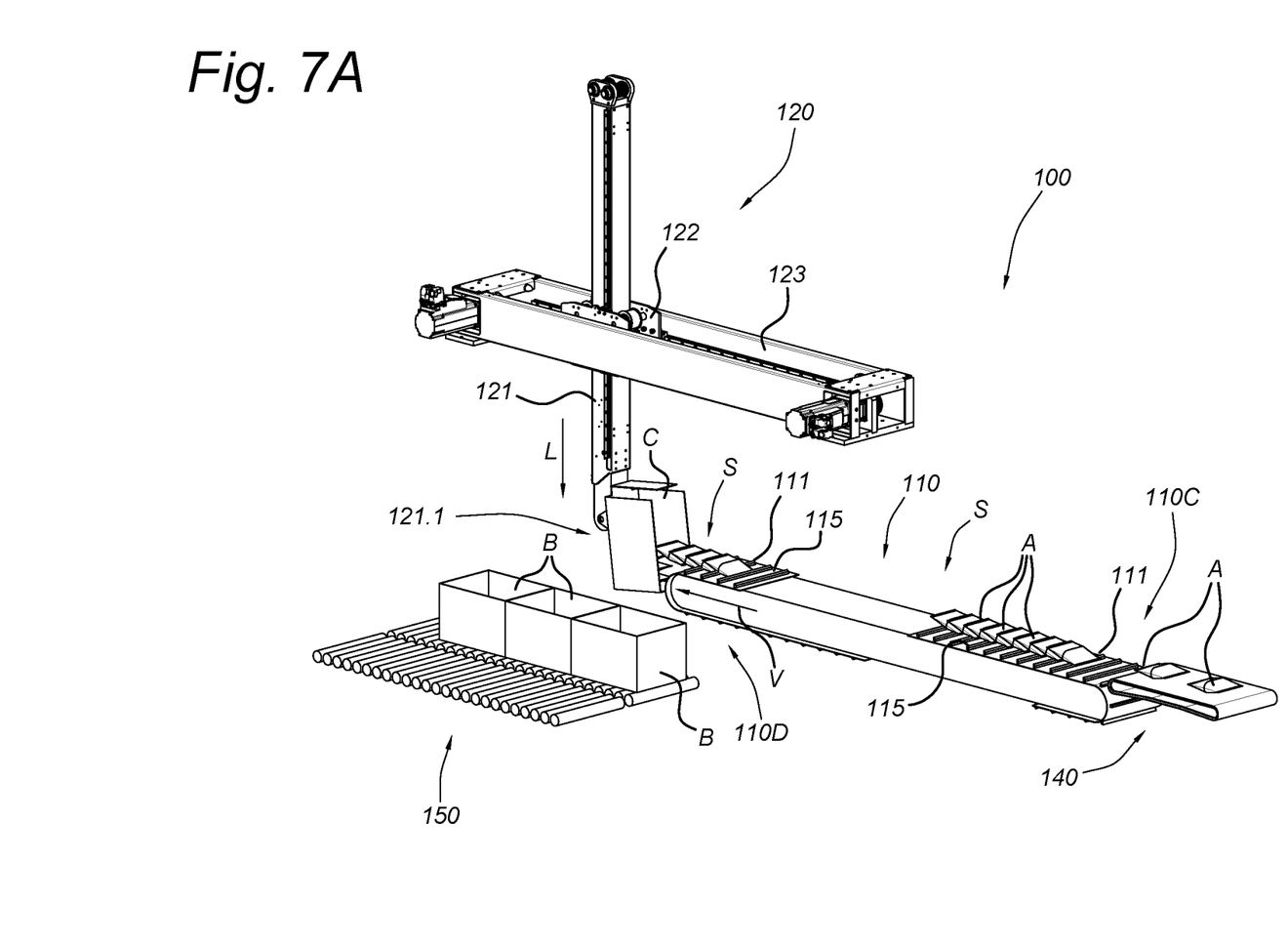
FIGS. 7A and 7B shows yet further embodiments of the invention, which are largely similar to one another.
Figure 7B:
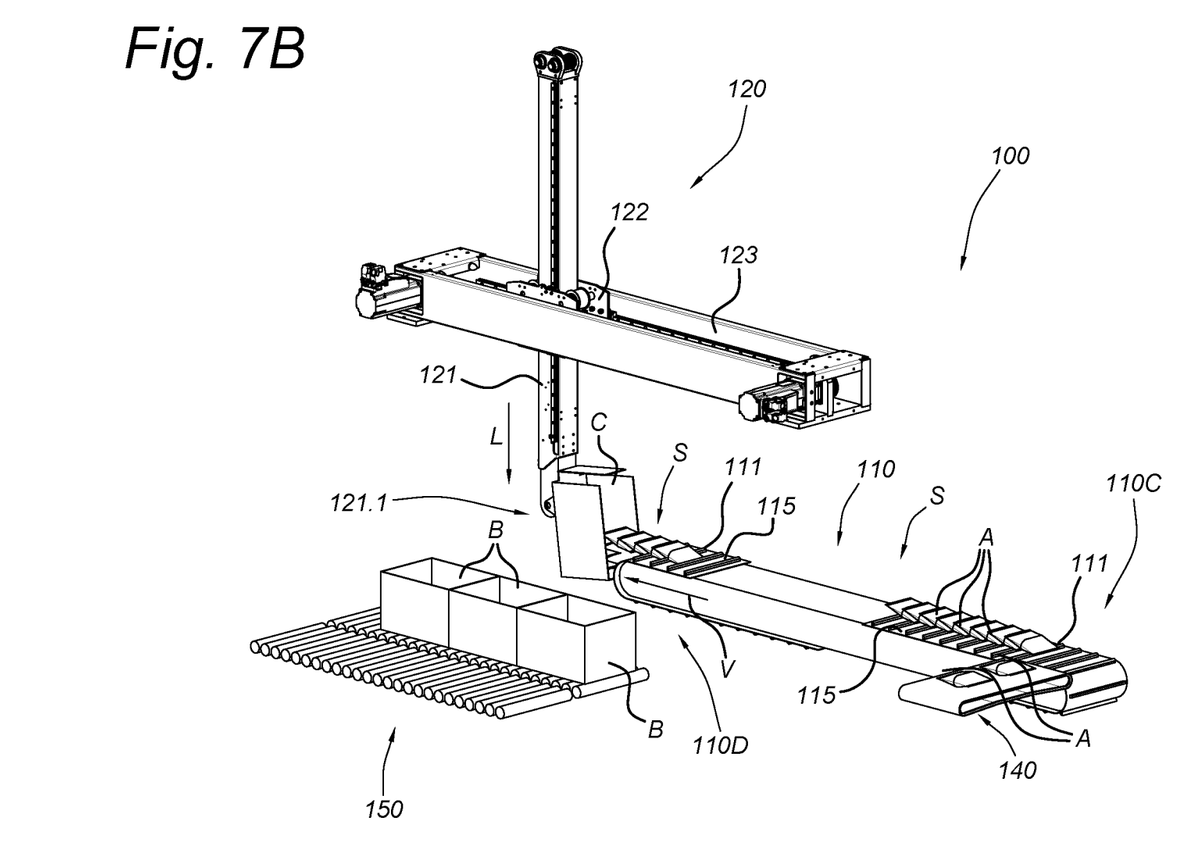

FIGS. 7A and 7B show further embodiments of the invention. The embodiment of FIGS. 7A and 7B employ the same type of packing robot 120 as the embodiment of FIG. 6. The pre-grouping conveyor 110 of the embodiment of FIGS. 7A and 7B has two or more stretches of pre-grouping conveyor-belt 111 that are each guided along the same endless continuous track of the pre-grouping conveyor 110. The pre-grouping conveyor has multiple drives (not shown) that each drive a stretch of pre-grouping conveyor-belt 111 at a required speed or in a specific movement pattern. Each stretch of pre-grouping conveyor-belt is independently drive by its own assigned drive. A stretch of conveyor-belt 111 at the discharging end 110D of the pre-grouping conveyor 110 is driven at the speed V that is required to provide the set S of articles A into the cassette box C.

A stretch of conveyor-belt at the charging end 110C of the pre-grouping conveyor of FIGS. 7A and 7B is driven at a lower speed the a speed V required to provide articles form the pre-grouping conveyor-belt into the cassette box C or in a specific movement pattern, for instance, an intermittent movement pattern, when a set S of articles A is pre-grouped by supplying articles from the article supply conveyor 140 onto the pre-grouping conveyor-belt 111 at the charging end 110C. The embodiment of FIG. 7A shows that the article supply conveyor supplies the articles A in a direction along the pre-grouping conveyor 110, while in the embodiment of FIG. 6B the article supply conveyor 140 supplies the articles A in a direction perpendicular to the direction of the pre-grouping conveyor 110. The article supply conveyor 140 and the stretch of pre-grouping conveyor-belt 111 at the charging end 110C of the pre-grouping conveyor 110 are mutually driven such that articles A in a pre-grouped set S of articles overlap as shown.

When a set of articles A has been grouped into a set S of pre-grouped articles, the respective stretch of pre-grouping conveyor-belt with the set S of pre-grouped articles is driven at a speed V appropriate for providing the articles into the cassette box C as has been described earlier. While the articles are being provided from one stretch of pre-grouping conveyor-belt 111 into the cassette box C, a next set of articles is being pre-grouped onto a following stretch of pre-grouping conveyor-belt 111 that is guided along the track of the pre-grouping conveyor 110 as shown in FIGS. 7A and 7B. The track is shown to be an endless track guiding two stretches of pre-grouping conveyor-belts 111. After off-loading articles A from a stretch of conveyor-belt 111, said stretch is moved towards the charging end 110C of the pre-grouping conveyor 110 for pre-grouping a next set of articles.

A stretch of pre-grouping conveyor-belt 111 of FIGS. 7A and 7B can be configured as a continuous stretch of material with, for instance, upright holding strips as shown. Alternatively, a stretch of pre-grouping conveyor-belt can be configured by individual lamellae that are coupled to one another or each coupled to their common drive. The skilled may further envision equivalent embodiments of a stretch of pre-grouping conveyor-belt.

The invention claimed is:

1. A packing method of transversely packing bags of a product as articles (A) into a packing box (B) through a packing box opening with a longitudinal direction of the articles along a packing box side wall and transverse to a packing box bottom opposite the packing box opening, wherein the packing box side wall extends from a side of the packing box opening and of the packing box bottom, the method comprising supplying the articles on at least one article supply conveyor;

pre-grouping articles to be packed into the packing box into a set of pre-grouped articles on a pre-grouping surface provided by a pre-grouping conveyor-belt of a pre-grouping conveyor having a charging end and a discharging end, wherein the articles are pre-grouped in at least one row of articles to provide the set of pre-grouped articles such that each subsequent article in a row partly overlaps a preceding article in said row, wherein a first article in each row of the at least one row is at an end of the row associated with the discharging end of the pre-grouping conveyor, wherein the pre-grouping articles comprises consecutively:

in an initial step, collecting individual articles from the at least one article supply conveyor into a set of pre-grouped articles on a pre-grouping surface at the charging end of the pre-grouping conveyor, and in an immediate subsequent step, providing said set of pre-grouped articles on the pre-grouping surface at the charging end to a pre-grouping surface at the discharging end of the pre-grouping conveyor, wherein pre-grouping surfaces at the charging and discharging ends are separately driven; and providing the articles of the set of pre-grouped articles from the pre-grouping surface of the pre-grouping conveyor-belt into the packing box consecutively by:

providing one of a cassette box and the packing box at the discharging end of the pre-grouping conveyer such that an opening of said one of the cassette box and the packing box faces the discharging end of the pre-grouping conveyor for the articles of the set of pre-grouped articles to be discharged from the pre-grouping conveyor belt into said one of the cassette box and the packing box such that the first article in a row of the set of pre-grouped articles is supported on a side wall of said one of the cassette box and the packing box while each subsequent article provided in said one of the cassette box and the packing box is supported on the preceding article of the pre-grouped set, wherein said side wall is to a side of said opening;

moving linearly downwards said one of the cassette box and the packing box in a continuous fashion while driving the pre-grouping surface at the discharging end of the pre-grouping conveyor-belt in a continuous fashion such that the set of pre-grouped articles on the pre-grouping surface of the pre-grouping conveyer-belt moves towards the discharging end of the pre-grouping conveyor and the opening of said one of the cassette box and the packing box, and that the articles of the set of pre-grouped articles are discharged from the pre-grouping conveyor-belt into said one of the cassette box and the packing box such that the first article in a row of the set of pre-grouped articles is supported on said side wall of said one of the cassette box and the packing box, while each subsequent article provided in said one of the cassette box and the packing box is supported on the preceding article of the pre-grouped set, wherein the pre-grouping conveyor-belt is driven at a velocity providing sufficient speed to each article of the set of pre-grouped articles discharged from the pre-grouping conveyor-belt to bridge a gap between the discharge end of the pre-grouping conveyor and said one of the cassette box and the packing box into said one of the cassette box and the packing box; and in case the articles of the set of pre-grouped articles are provided into the cassette box, providing the articles from the cassette box through the opening thereof into the packing box through the packing box opening.

2. The packing method according to claim 1, wherein the pre-grouping conveyor comprises first and second pre-grouping conveyor parts, each having a pre-grouping conveyor-belt comprising the pre-grouping surface, and in the initial step articles are pre-grouped into a set of pre-grouped articles on the pre-grouping surface of the pre-grouping conveyor-belt of the second pre-grouping conveyor part arranged at the charging end of the pre-grouping conveyor, and in the subsequent step are transferred to the pre-grouping surface of the pre-grouping conveyor-belt of the first pre-grouping conveyor part arranged at the discharging end of the pre-grouping conveyor by driving the conveyor-belts of the first and second pre-grouping conveyor parts.

3. The packing method according to claim 1, wherein the pre-grouping conveyor comprises at least two stretches of pre-grouping conveyor-belt, each stretch of pre-grouping conveyor-belt comprising the pre-grouping surface and being guided along a same track of the pre-grouping conveyor and each stretch of pre-grouping conveyor-belt being driven by a separate drive to allow driving the stretches of pre-grouping conveyor-belt independent from one another, and in the initial step articles are pre-grouped into a set of pre-grouped articles on the pre-grouping surface of a stretch of pre-grouping conveyor-belt provided at the charging end of the pre-grouping conveyor, and in the subsequent step are provided on the respective stretch of pre-grouping conveyor-belt to the discharging end of the pre-grouping conveyor by appropriately driving the respective stretch of pre-grouping conveyor-belt.

4. The packing method according to claim 1, wherein said one of the cassette box and the packing box is held and moved by a robot arm of a packing robot, the robot arm allowing for a movement thereof to position said one of the cassette box and the packing box, optionally the robot arm allowing for an articulated movement, optionally the robot arm being configured as a beam that can be driven in at least two orthogonal directions and having a pivotal arrangement at an end of the beam for holding said one of the cassette box and the packing box.

5. The packing method according to claim 1, wherein the article supply conveyor is provided at a higher level than the pre-grouping conveyor, and, when pre-grouping articles into a set of pre-grouped articles, the pre-grouping surface at the charging end of the pre-grouping conveyor is driven intermittently to provide a set of pre-grouped articles such that each subsequent article in a row partly overlaps a preceding article in the row.

6. The packing method according to claim 1, wherein the articles are positioned on the pre-grouping surface at the charging end of the pre-grouping conveyor using a delta robot to provide the set of pre-grouped articles.

7. The packaging method of claim 1, wherein the step of providing one of a cassette box and the packing box at the discharging end of the pre-grouping conveyer belt such that an opening of said one of the cassette box and the packing box faces the discharging end of the pre-grouping conveyor belt comprises providing the cassette box or packing box at the discharging end of the pre-grouping conveyer belt such that the side wall which supports the articles is in the same plane or a parallel plane to the pre-grouping conveyor.

8. The packaging method of claim 1, wherein the step of moving downwards said one of the cassette box and the packing box in a continuous fashion while driving the pre-grouping conveyor-belt in a continuous fashion comprises moving said one of the cassette box and the packing box translationally downwards in a direction perpendicular to the movement direction of the pre-grouping conveyor-belt.

9. A packing device for transversely packing bags of a product as articles into a packing box through a packing box opening with a longitudinal direction of the articles along a packing box side wall and transverse to a packing box bottom opposite the packing box opening, wherein the packing box side wall is to a side of the packing box opening and of the packing box bottom, the device comprising
an article supply conveyor for supplying articles;
an arrangement for pre-grouping articles to be packed into the packing box into the set of pre-grouped articles on the pre-grouping surface, wherein the arrangement comprises a pre-grouping conveyor having a pre-grouping conveyor-belt providing the pre-grouping surface for pre-grouping articles to be packed into the packing box into the set of pre-grouped articles; and
a holding and manipulating assembly providing one of a cassette box and the packing box at a discharging end of the pre-grouping conveyor such that an opening of said one of the cassette and the packing box faces the discharging end of the pre-grouping conveyor,
wherein the packing device is configured for performing the packing method of claim 1.

10. The packing device of claim 9, wherein the pre-grouping conveyor comprises first and second pre-grouping conveyor parts, each having a pre-grouping conveyor-belt comprising the pre-grouping surface, and which are configured so that in the initial step articles are pre-grouped into a set of pre-grouped articles on the pre-grouping surface of the pre-grouping conveyor-belt of the second pre-grouping conveyor part arranged at the charging end of the pre-grouping conveyor, and in the subsequent step are transferred to the pre-grouping surface of the pre-grouping conveyor-belt of the first pre-grouping conveyor part arranged at the discharging end of the pre-grouping conveyor by driving the conveyor-belts of the first and second pre-grouping conveyor parts.

11. The packing device of claim 9, wherein pre-grouping conveyor comprises at least two stretches of pre-grouping conveyor-belt, each stretch of pre-grouping conveyor-belt comprising the pre-grouping surface and being guided along a same track of the pre-grouping conveyor and each stretch of pre-grouping conveyor-belt being driven by a separate drive to allow driving the stretches of pre-grouping conveyor-belt independent from one another, and which are configured so that in the initial step articles are pre-grouped into a set of pre-grouped articles on the pre-grouping surface of a stretch of pre-grouping conveyor-belt provided at the charging end of the pre-grouping conveyor, and in the subsequent step are provided on the respective stretch of pre-grouping conveyor-belt to the discharging end of the pre-grouping conveyor by appropriately driving the respective stretch of pre-grouping conveyor-belt.

12. The packing device according to claim 9, wherein the holding and manipulating assembly comprises a packing robot having a robot arm for holding and moving said one of the cassette box and the packing box, the robot arm allowing for a movement thereof to position said one of the cassette box and the packing box.

13. The packaging device according to claim 12, wherein the robot arm allows for an articulated movement.

14. The packaging device according to claim 12, wherein the robot arm is configured as a beam that can be driven in at least two orthogonal directions and has a pivotal arrangement at an end of the beam for holding said one of the cassette box and the packing box.

15. A packing method of packing bags of a product as articles (A) into a packing box (B) through a packing box opening with a longitudinal direction of the articles along a packing box side wall and transverse to a packing box bottom opposite the packing box opening, wherein the packing box side wall extends from a side of the packing box opening and of the packing box bottom, the method comprising
pre-grouping articles to be packed into the packing box into a set of pre-grouped articles on a pre-grouping surface, wherein the pre-grouping articles comprises consecutively:
collecting individual articles into a set of pre-grouped articles on the pre-grouping surface at the charging end of the pre-grouping conveyor, and
providing said set of pre-grouped articles on the pre-grouping surface at the charging end to a pre-grouping surface at the discharging end of the pre-grouping conveyor, wherein the pre-grouping surfaces at the charging and discharging ends are separately driven; and
providing the articles of the set of pre-grouped articles from the pre-grouping surface of the pre-grouping conveyor-belt into the packing box consecutively by:
providing a cassette box at the discharging end of the pre-grouping conveyer such that an opening of said cassette box faces the discharging end of the pre-grouping conveyor for the articles of the set of pre-grouped articles to be discharged from the pre-grouping conveyor belt into said cassette box such that a first article in a row of the set of pre-grouped articles is supported on a side wall of said cassette box while each subsequent article provided in said cassette box is supported on the preceding article of the pre-grouped set, wherein said side wall is to a side of said opening;
moving linearly downwards said cassette box in a continuous fashion while driving the pre-grouping surface at the discharging end of the pre-grouping conveyor-belt in a continuous fashion such that the set of pre-grouped articles on the pre-grouping surface of the pre-grouping conveyer-belt moves towards the discharging end of the pre-grouping conveyor and the opening of said cassette box, and that the articles of the set of pre-grouped articles are discharged from the pre-grouping conveyor-belt into said cassette box such that the first article in a row of the set of pre-grouped articles is supported on said side wall of said cassette box, while each subsequent article provided in said one of the cassette box and the packing box is supported on the preceding article of the pre-grouped set, wherein the pre-grouping conveyor-belt is driven at a velocity providing sufficient speed to each article of the set of pre-grouped articles discharged from the pre-grouping conveyor-belt to bridge a gap between the discharge end of the pre-grouping conveyor and said cassette box into said cassette box; and providing the articles from the cassette box through the opening thereof into the packing box through the packing box opening.

\* \* \* \* \*